Figure 1:
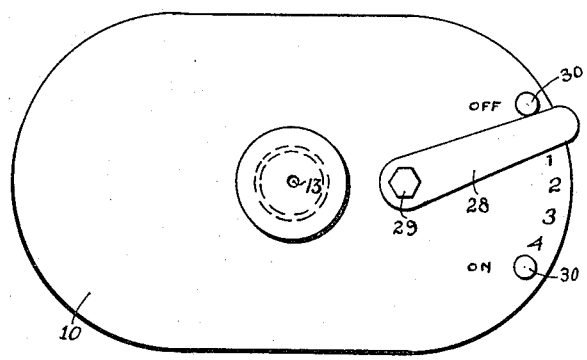

H. LEIDEL.
FINGER TIP INFILTRATOR.
APPLICATION FILED JUNE 8, 1914.

1,158,695.

Patented Nov. 2, 1915.

WITNESSES:
John H. Jericho
Emanuel B. Kranzer

INVENTOR
Henry Leidel.

BY
Gustav Rasmus
ATTORNEY

COLUMBIA PLANOGRAPH CO., WASHINGTON, D. C.

UNITED STATES PATENT OFFICE.

HENRY LEIDEL, OF RICHMOND HILL, NEW YORK.

FINGER-TIP INFILTRATOR.

1,158,695.   Specification of Letters Patent.   Patented Nov. 2, 1915.

Application filed June 8, 1914. Serial No. 843,761.

*To all whom it may concern:*

Be it known that I, HENRY LEIDEL, a citizen of the United States, residing at Richmond Hill, in the county of Queens and State of New York, have invented new and useful Improvements in Finger-Tip Infiltrators, of which the following is a specification.

My invention relates to a finger tip infiltrator and has as its principal object the provision of a convenient and effective device for use by barbers, hairdressers, etc., for applying fluid to the ends of the fingers and scalp, etc.

A further object of my invention resides in the particular arrangement and combination of parts hereinafter described.

Referring to the drawings annexed hereto and forming a part of this specification and in which:—

Figure 2:
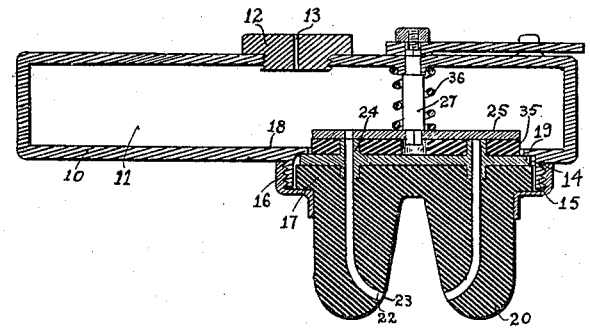
Figure 3:
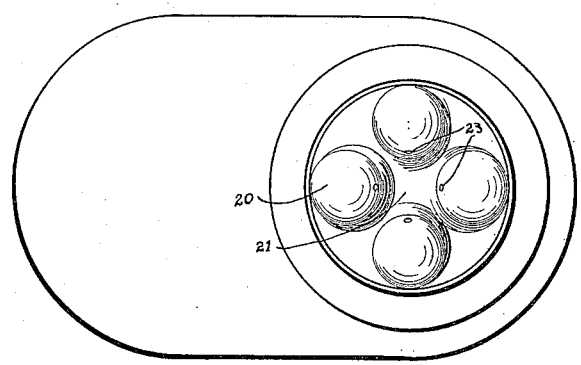
Figure 4:
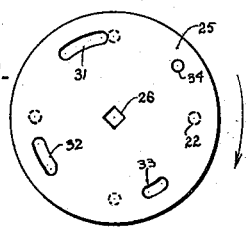

Figure 1 is a top plan view of a finger tip infiltrator constructed according to my invention. Fig. 2 is a longitudinal central sectional view of the device shown in Fig. 1. Fig. 3 is a bottom plan view of the device shown in Figs. 1 and 2. Fig. 4 is a view of the movable valve plate.

Throughout the separate views the same part is designated by the same reference character.

Referring more particularly to the drawings, 10 is a hollow casing adapted to receive fluid in the interior chamber 11. The liquid is introduced into the chamber 11 through an aperture in the top of the casing, said aperture being normally closed by a plug 12 through which is an air vent 13 to permit entrance of air while the liquid is being drawn out.

The bottom of the casing 10 is provided with an aperture 14 surrounding which is an outwardly threaded flange 15 which is screw threaded to receive an aperture nut 16. Mounted in the aperture 14 and held in place by the nut 16 is a rubber disk 17, there being an inwardly projecting flange 18 at the inner edge of the aperture 14 against which bears a metal plate 19 fastened to the inner surface of the disk 17. Projecting outwardly from the disk 17 are four flexible rubber fingers such as 20. As shown in Fig. 3, the fingers 20 are arranged in a rectangular formation leaving a space 21 between them. Also it will be seen that the fingers 20 each have a small passage 22 through which liquid may be delivered to that part of the body of the person to be treated, each passage 22 ending in an aperture 23, preferably facing the space 21.

It will be seen that the plate 19 previously mentioned carries a number of nipples 24 through which the passages 22 pass. The upper ends of the nipples 24 serve as valve seats for a valve plate 25. It will be seen that the valve plate 25 is provided with a flared aperture 26 through which projects the square end of a stem 27, the upper end of which is likewise square and passes through a handle 28, a bolt 29 being provided to hold the handle in place. The top of the casing 10 is provided with two stops 30—30 between which the handle 28 projects and which limit the movement in either direction. The casing between the stops 30 likewise is numbered from 1 to 4 as shown in Fig. 1, to indicate the four positions of the valve disk 25. Now it will be seen from Fig. 4 that the valve disk is provided with four ports 31, 32, 33 and 34 each of which is arranged to coöperate with one of the passages 22 to admit liquid thereto. However, it will be seen from Fig. 4 that the valve aperture 31 is of considerable length and placed at such angular position that it will open its corresponding passage before any of the other passages are opened. As the disk is turned in the direction of the arrow in Fig. 4, the port 32 will open in the corresponding passage and so will ports 33 and 34 in order. It will be seen, however, that the port 31 is of sufficient length to remain in registry with its own port while the disk is being turned a distance sufficient to bring each of the other ports into register. Also port 32 is of sufficient length to remain in register while ports 33 and 34 are being brought into register, while port 33 is of sufficient length to remain in register while port 34 is being brought into register.

As a consequence of the arrangement just mentioned the valve disk can take any one of four operative positions in which either 1, 2, 3 or 4 of the passages 22 are opened to the chamber 11 and may deliver liquid to the finger tips.

It will be seen that the outer ends of the nipples 24 are surrounded by a rubber disk 35 which is of sufficient thickness to coöperate with the valve disk 25 so as to prevent leakage along the inner face of the valve disk.

Moreover, a spring 36 is provided which presses the valve disk firmly against the disk 35.

It will be understood that while I have shown and described the preferred form of my invention, that I do not wish to be limited thereto but contemplate such modifications as are mechanically equivalent to those shown and described herein.

Having thus described my invention, what I claim is:—

1. A device of the class described comprising in combination, a plurality of resilient fingers, said fingers having passages opening at a point adjacent to the tips, a liquid reservoir with which said passages are connected, and a valve for controlling the inner end of said passages, said valve comprising a disk having a plurality of ports therein each of which subtends an angle of increasing dimension, whereby one or more of said passages may be opened as desired.

2. A device of the class described comprising in combination, a reservoir adapted to contain liquid, a plurality of resilient fingers having passages therethrough, said fingers terminating in a disk formation, a metallic plate disposed in said disk formation, nipples carried by said metallic plate and extending into the passages in said fingers, a rubber disk disposed over said plate and having apertures therein fitting over the upper ends of said nipples, and a valve disk disposed on said rubber disk and adapted to open and close the upper end of said nipples thereby regulating the flow through the passages in said fingers.

3. A device of the class described comprising in combination, a reservoir for containing a liquid, same reservoir having passages leading therefrom, a plurality of resilient fingers to receive liquid from said passages, and means for opening and closing said passages successively, comprising a disk having a plurality of ports therethrough each of which subtends an angle of increasing dimensions, whereby one or more of said passages may be opened as described.

In testimony whereof I affix my signature in the presence of two witnesses.

HENRY LEIDEL.

Witnesses:
GUSTAV RASMUS,
EMANUEL C. KRAUZER.

Copies of this patent may be obtained for five cents each, by addressing the "Commissioner of Patents, Washington, D. C."